United States Patent
Christie

[11] 3,861,422
[45] Jan. 21, 1975

[54] SPLIT-SLEEVE PIPE DEVICE

[76] Inventor: Joe William Christie, 1118 E. Main St., Frisco, Tex. 75034

[22] Filed: Oct. 24, 1973

[21] Appl. No.: 409,049

[52] U.S. Cl. .................... 138/99, 285/197, 285/373
[51] Int. Cl. ............................................ F16l 41/06
[58] Field of Search .......... 138/99, 97, 148; 285/53, 285/197, 373

[56] References Cited
UNITED STATES PATENTS

| | | | |
|---|---|---|---|
| 2,146,067 | 2/1939 | Graham | 285/373 |
| 2,706,495 | 4/1955 | Risley | 138/148 |
| 2,816,575 | 12/1957 | Stokes | 138/148 |
| 2,899,984 | 8/1959 | Gaffin | 138/99 |
| 2,928,411 | 3/1960 | Johnson | 138/148 X |

FOREIGN PATENTS OR APPLICATIONS

| | | | |
|---|---|---|---|
| 965,005 | 6/1957 | Germany | 285/197 |
| 740,433 | 11/1955 | Great Britain | 285/373 |
| 1,153,912 | 10/1957 | France | 138/99 |

*Primary Examiner*—Charles A. Ruehl
*Attorney, Agent, or Firm*—Clegg, Cantrell & Crisman

[57] ABSTRACT

A split-sleeve type pipe coupling for assembly on a pipe for sealing off at a leak, for hot tapping the pipe at a desired location, or for severing and electrically insulating the pipe for cathodic protection. The coupling includes longitudinally split annular electrical insulators, a one-piece gasket having split annular end portions connected by longitudinal side runner seal portions, and a pair of housing halves which fit together over the gasket to form a sealed housing along the pipe. One of the housing halves has an externally threaded side boss defining an opening into the housing through one of the shell halves for manipulation of pipe cutting equipment and for connection of a valve or other suitable equipment. Both housing halves have internal flanges for holding and positioning the insulators and gasket. Also end set screws are provided in the housing halves for gasket adjustment.

10 Claims, 3 Drawing Figures

PATENTED JAN 21 1975 3,861,422

SPLIT-SLEEVE PIPE DEVICE

BACKGROUND OF THE INVENTION

This invention relates to pipe devices and more particularly relates to a pipe fitting which may be used to seal a leak in a pipe, may be secured around the pipe at a desired location for cutting into and making a connection with the pipe, and may be used to cut across, seal, and electrically insulate pipe sections for cathodic protection. The need for a split-sleeve type pipe couplings of the nature of the invention is encountered under several differrent circumstances. In one instance, when a leak occurs in a pipe section, the device can be employed to seal the leak. In other situations where it is desired to hot tap a line under pressure to make a lateral connection into the line, a device of the nature of the invention can be used to make such connection and secure a valve into the tapped line. In still other circumstances, it may be desirable to cut and electrically insulate sections of a pipe line for the purpose of providing cathodic protection which requires that sections of the line be electrically isolated from each other. While pipe apparatus capable of fulfilling these several functions has been known, there are certain features of this invention which are desirable and believed superior to those known to have been employed in similar type apparatus. Particularly, the use of a unitary or one-piece gasket is preferred over several separate gaskets. Additionally, the means disclosed for independently adjusting of the gasket in the present invention is an improvement over prior apparatus. Further, the use of electrical insulators separate from the gasket means is desirable.

SUMMARY OF THE INVENTION

The pipe device of the invention provides apparatus for sealing off a leak in a pipe section, for cutting a pipe section and connecting a lateral line into it while the pipe section is under pressure, and for severing a pipe line into sections and coupling the sections in an electrically isolated relationship for such purposes as cathodic protection.

The device includes a pair of semi-cylindrical half-sleeve housing sections one of which has means for introduction of a pipe cutter and the connection of a valve for securing a lateral line into the housing. The device includes a plurality of spaced annular insulators for confinement between the sleeve halves around the pipe to electrically insulate the pipe sections from each other. Also included is a one-piece gasket having split annular end portions and longitudinal side runner portions for sealing between the half sections and around the pipe. One of the housing halves has an externally threaded boss providing an opening for insertion of a pipe cutter and for the subsequent connection of a valve or closure member. End flanges on the two housing halves are provided with longitudinally extending set screws for adjusting the insulators and the gasket within the halves around the pipe to improve the seal between the housing sections and the pipe.

At the desired location on the pipe to which the device is to be connected, the annular electrical insulators are opened and positioned around the pipe, the gasket is assembled over the insulators, and the housing halves are placed around the gasket and insulators. The housing halves are bolted together followed by tightening the set screws to aid in uniformly expanding the gasket for sealing between the housing halves and around the pipe. After the coupling is so assembled on the pipe, a gate valve and drilling machine may be installed through the side opening, and the pipe then severed. Where the device is being installed to plug a leak, the side opening may be closed with a suitable cap.

DESCRIPTION OF THE PREFERRED EMBODIMENT

Figure 3:
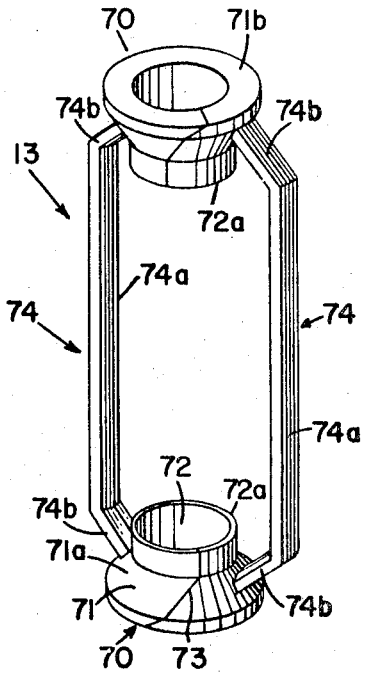
FIG. 3 is a perspective view of the one-piece gasket employed in the invention.

Referring to the drawings, a split-sleeve pipe device embodying the features of the invention includes an upper semi-cylindrical housing half-section 11, a lower semi-cylindrical half-section 12, a one-piece gasket 13, and split annular end and central insulators 14 and 15, respectively. The insulators fit directly on a pipe 20 which is being repaired or being tapped for a lateral connection or cut for installation of a cathodic protection system. The insulators fit directly on the pipe within the gasket 13 which is tightly confined around the pipe by the two housing halves 11 and 12.

The upper housing half 11 has a principal semi-cylindrical body portion 21 with integral sidewardly extending longitudinal flange portions 22 having spaced protuberances provided with vertical bolt holes 23, 24, and 25. The body portion 21 also has inwardly extending internal end flanges 30 which have circumferentially spaced threaded holes 31 for axially extending set screws 32 which perform a gasket sealing function to be described later. The upper housing half 11 has an upwardly extending externally threaded tubular portion or boss 33 defining an opening to which may be secured a valve or a closure cap, and through which pipe cutting and other operating functions may be performed. As illustrated, a threaded fitting 34 is secured in the boss 33 defining an opening for the admission of certain tools such as cutting devices discussed hereinafter. Also, as shown, the opening into the housing member 11 through the boss 33 is closed by an internally threaded cap 35. The interior of the housing half 11 is provided with a series of internal flanges and seat surfaces which are not shown in the drawings, but which are identical to and correspond with the same features illustrated and which will be described in connection with the lower housing half 12.

Figure 1:
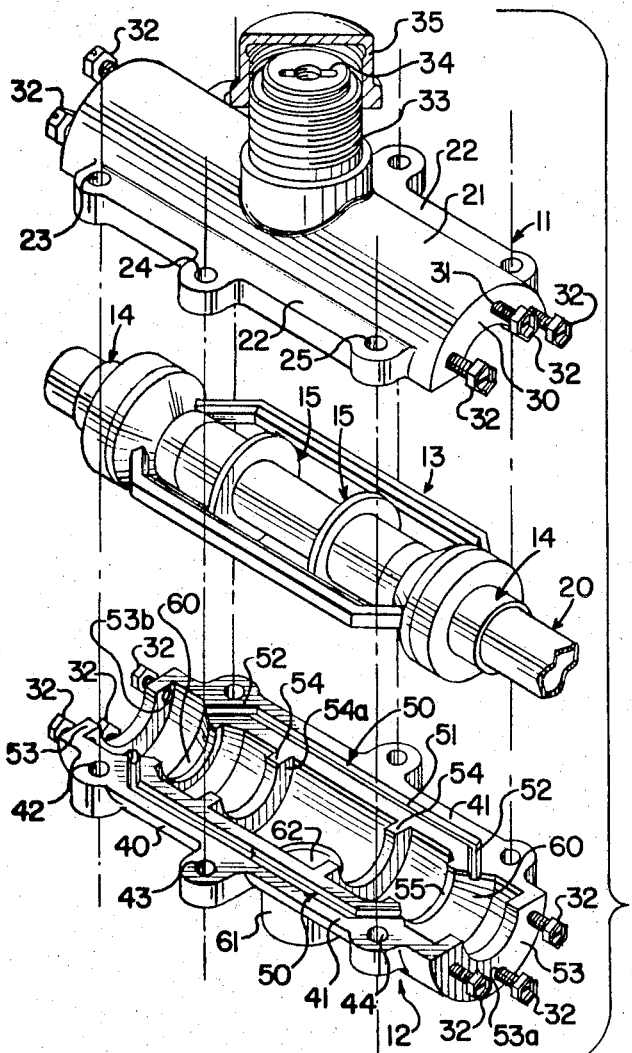
FIG. 1 is an exploded perspective view of a pipe device embodying the invention showing the two housing halves on opposite sides of the gasket mounted on the pipe around the annular insulators.
Figure 2:
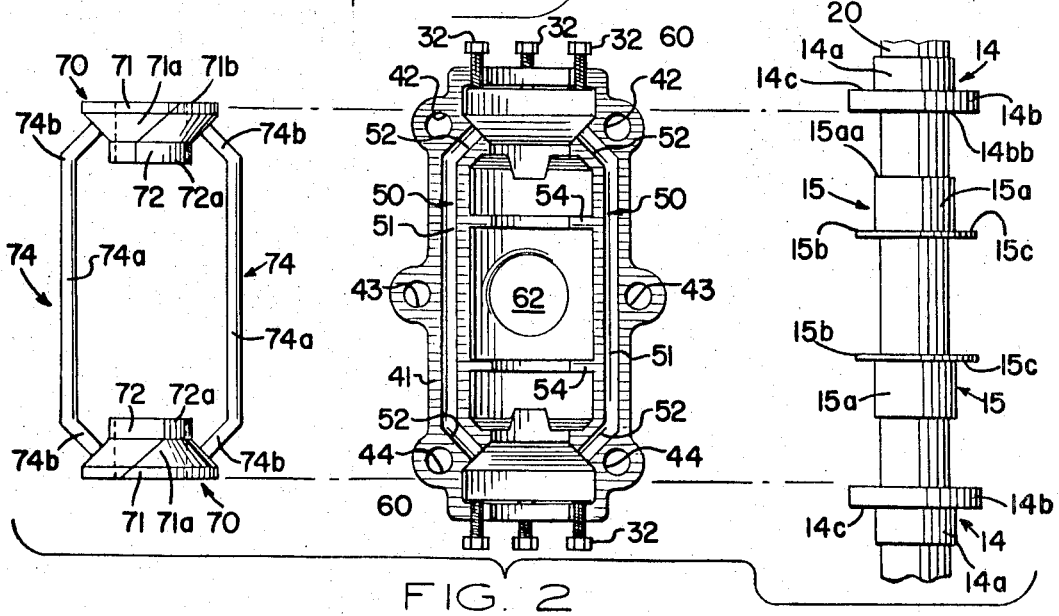
FIG. 2 is an exploded top plan view of the various components of the invention illustrating the annular insulators on the pipe section prior to assembly of the housing halves and gasket on the pipe.

The lower housing half 12, as shown in FIGS. 1 and 2, includes a central cylindrical body portion 40 provided with longitudinal outwardly extending side flanges 41 which have longitudinal spaced protuberances having vertical bolt holes 42, 43, and 44 to receive bolts for connecting the lower housing half to the upper half around the pipe and insulators and gasket. The upper face of the housing half 12 has longitudinally extending gasket grooves 50 each formed by an elongated straight portion 51 and inwardly angled end portions 52. The gasket grooves each receive a runner portion of the gasket 13 to be described later. The gasket grooves 50 are actually formed in and extend along edge portions of the body 40 and the side flanges 41. It will be understood that the upper housing half 11 has identical corresponding gasket grooves which are not shown, but which register with the gasket groove 50 in the lower half when the two halves are fitted together to accommodate the side runners of the gasket 13. The housing half 12 has inwardly extending semi-circular end flanges 53 which correspond with end flanges 30 on the upper housing half 11 so that when the two halves are secured together the corresponding flanges 30 and 53 combine to form a flanged circular closure at each end of the pipe device around the pipe 20. The end flanges 53 of the lower half 12 have internally threaded holes 53a for axially aligned set screws 32 which perform a gasket sealing function as the screws 32 in the upper half section.

The interior of the lower housing half 12 has a pair of spaced internal central half circular flanges 54 provided on opposite sides of the geometrical center of the housing half. The interior of the housing half 12 is also provided with spaced internal flanges 55 which are positioned outwardly of and on opposite sides of the central flanges 54. Each of the flanges 55 has an outwardly facing conical gasket seat surface 60. The lower housing half has a centrally located bottom hollow cylindrical portion 61 providing a cylindrical chamber 62 opening into the housing half between the flanges 54. The chamber 62 provides space for portions of a valve or valve stem and may serve a function in connection with cutting the pipe within the housing.

Referring to FIG. 3, the gasket 13 includes a pair of identical split annular end members 70 which include a conical body portion 71 and an axial cylindrical flange portion 72 forming an integral end member which is cut along an angle designated by the line 73 permitting each of the end members to be spread apart to fit around the pipe 20 when assembling the gasket on the pipe. The conical face 71a of the conical portion 71 of the gasket end member is formed at an angle to conform with the angle of the conical flange face 60 in the housing halves 11 and 12. The axial length of the end members if gauged to properly fit the dimensions of the housing halves 11 and 12 with the annular insulator members in position within the housing. The gasket 13 also includes a pair of identical integral side runners 74 formed by parallel longitudinal elongated portions 74a and inwardly angled end portions 74b which are dimensioned and positioned at proper angles to register with the gasket grooves 51 and 52 in the two housing halves 11 and 12 so that the gasket runners fit snugly in the groove for sealing between the housing halves. The gasket is a single piece flexible member of a material such as neoprene which is readily opened to fit it around the pipe in assembling the pipe device on the pipe 20.

The end insulators 14 are each split annular members having a tubular body portion 14a sized to fit around the pipe 20 and an external flange portion 14b sized to fit within the housing halves 11 and 12 when assembled on the pipe between the flanges 54 and 55. The flange 14b defines what shall be referred to as a "follower ring" for engaging the outer or end face 71b of the end members 70 of the gasket 13 to properly hold the gasket in a seated compressed condition as discussed hereinafter. Each of the insulators 15 includes a cylindrical portion 15a sized to fit around the pipe 20 within the flanges 54 of the housing halves. The insulators 15 also include annular integral flange portions 15b which are sized to fit within the diameter of the interior of the housing halves between the central flanges 54. The insulators 14 and 15 may be made of polyethylene for electrically insulating sections of the pipe 20 from each other for such purposes as cathodic protection.

Preparatory to installing the split-sleeve pipe device on the pipe 20 at a desired location along the length of the pipe, for purposes of tapping into the pipe, repairing a leak at such location, or cutting the pipe to install a cathodic protection system, all dirt, rust and pipe coating is cleaned from the pipe along the length over which the split sleeve is to be installed. The two pairs of insulators 14 and 15 are opened and placed around the pipe 20 in the relative longitudinal positions shown by the right hand drawing of FIG. 2. The spacing of the two central insulators 15 on the pipe is determined by the spacing of the internal flanges 54 within the housing halves 11 and 12. The outside face 15c of the flange 15b fits against the inside face 54a of the sleeve flange 54 with the tubular portion 15a of the insulator extending outwardly so that when the housing halves are fitted over the insulators, the cylindrical portion 15a of each insulator 15 will pass through the flange 54 against which the flange 15b rests. Similarly, the insulators 14 are each positioned so that each of the flanges 14b is within an end portion of the housing half with the outer face 14c of the flange 14b resting against the inside face 53b of the adjacent end flange 53 of the housing half. When so positioned, the cylindrical portion 14a of the insulator passes outwardly through the end flange 53 of the housing halves to insulate the split sleeve housing from the pipe.

After the insulators 14 and 15 are placed around the pipe at the approximate locations described, the end members 70 of the gasket 13 are spread apart and the gasket is placed around the pipe with each of the end members being disposed between an insulator 14 and an insulator 15 in the relationship illustrated in the center drawing of FIG. 1. When so positioned, the inside end edge 72a of each of the gasket end portions engages the end edge 15aa of the adjacent insulator 15 and the outside end face 71b of the insulator end portion engages the inside face 14bb of the flange 14b of the insulator 14. The complete assembly of the gasket and the insulators in their proper relative positions on the pipe 20 is illustrated in the central drawing of the FIG. 1.

The bottom housing half 12 is then positioned under the pipe and aligned with the insulators and gasket so that the flanges 15b of the central insulators 15 are within and against the inside faces 54a of the internal flanges 54 of the housing half. The conical body portion 71 of the gasket end member 70 and the adjacent flange 14b of the insulator 14 fit within the end chambers of the housing halves between the flanges 53 and 55 at each of the housing as evident from FIGS. 1 and 2. The lower housing half 12 is held in position beneath the pipe around the bottom half of the insulators and gasket 13 with the side runners 74 of the gasket fitted along the grooves 50 along each side of the housing half. The top housing half 11 is similarly aligned and placed over the upper halves of the insulators and gasket so that the bolt holes 23, 24 and 25 of the upper housing half are aligned with the bolt holes 42, 43, and 44, respectively, of the lower housing half 12. Two bolts, not shown, are inserted through the aligned central holes 24 and 43 of the upper and lower housing halves and nuts are placed on the bolts and turned hand-tight taking care that the insulators and gasket remain in place. The end set screws 32 at the ends of both of the upper and the lower halves 11 and 12 are tightened gradually and uniformly against the adjacent follower ring or insulator flange 14b at each end of the assembled split sleeve device. The set screws are turned until they are snug against the outer faces 14c of the follower rings on the insulators at each end of the device. The remaining side bolts, not shown, are placed through the aligned holes 23 and 42 and 45 and 44 of the split sleeve housing halves. The bolts are gradually and uniformly tightened along the opposite sides of the split sleeve housing using a 12-inch torque wrench until an estimated pull of approximately 60 pounds is reached. The set screws 32 are then tigntened with a 6-inch wrench against the follower rings 14b on the insulators 14 at each end of the device until an estimated pull of 40 pounds is reached.

With the split-sleeve device installed on the pipe 20 ad discussed, completion of sealing around the pipe is accomplished by screwing the cap 35 on the threaded side fitting 33 in those instances when the split sleeve device is used for leak repair purposes. Where the split sleeve device is placed on the pipe 20 for purposes of providing a side tap into the pipe or to sever the pipe for installation of a cathodic protection system, the split-sleeve device is first tested for leaks preparatory to the subsequent procedures. A suitable pressure fitting and a gauge, neither shown, are installed on the threaded connection 33. A soap solution is injected through the pressure fitting into the split-sleeve device housing to determine if there are any leaks around the pipe. Any leakage which might occur will be readily evident with the use of a soap solution injected under pressure into the assembled split sleeve device through the pressure test fitting.

The upper and lower housing halves are supported on and spaced from the pipe around the insulators 14 and 15 to electrically insulate the housing halves from the pipe. The forcing of the follower ring portions 14b of the end insulators against the gasket conical portions 70 squeezes and expands the annular gasket end portions around the pipe between the split sleeve flanges 54 and 55 at each end of the split-sleeve device thereby sealing off against leakage around the pipe within the housing. The action of the follower rings in forcing the gasket conical portions inwardly against the split sleeve conical faces 60 effects a tightened sealed relationship between the pipe and the inside surface of the portion 72 of the end members of the gasket and between the outer faces of the gasket, particularly along the conical faces 71a and the conical faces 60 of the housing halves. If the pipe is to be cut for cathodic protection purposes or for the connection of a lateral line, a suitable standard gate valve and drilling machine are installed on the threaded member 33 on the top split sleeve 11 as in the prior art. A suitable shell cutter, not shown, is used to completely cut the pipe 20 within the split-sleeve device between the flanges 54 of the split sleeve halves. After the pipe 20 has been cut, the drilling equipment is removed and completion equipment is inserted and a completion plug set. The completion equipment and gate valve are then removed and a pipe cap such as the cap 35 is then screwed on the portion 33. Again, it is preferred that the tension on all of the side bolts and the end set screws by checked to make sure that they are tightened to the stated torque. With the pipe so fitted and the severed portions of the pipe 20 cut within the split sleeve device, a complete pressure seal is formed around the pipe by the device, and the severed pipe sections are electrically insulated from each other. The use of separate electrical insulators and gasket provide a superior structure. The one-piece gasket is an improvement over previous multiple piece gasket arrangements. And, the use of separate independent gasket adjusting means including the follower rings and set screws permits improved gasket sealing.

I claim as my invention:

1. A split-sleeve type pipe device comprising: a cylindrical elongated housing enclosure including an upper housing-half section and a lower housing-half section connectable together around a pipe; each of said housing-half sections having first longitudinally spaced central internal semi-circular flanges disposed in planes perpendicular to the longitudinal axis of said housing-half section; each of said housing-half sections having a second pair of internal semi-circular flanges spaced apart longitudinally on opposite sides and outwardly of said first pair of internal flanges and disposed in planes perpendicular to the longitudinal axis of said housing sections, said second flanges each having an outwardly facing conical seal surface; said housing-half sections having inwardly extending end flanges disposed in planes perpendicular to the longitudinal axis of said housing sections; said housing-half sections each having a longitudinal gasket groove along each side edge of each of said half sections for accommodating an elongated gasket portion along each side of said housing enclosure from said conical gasket seat surface at one end of said enclosure to said conical gasket seat surface at the other end of said enclosure; each of said housing-half sections having longitudinal side flanges provided with bolt holes for coupling said housing-half sections together around a pipe; a first of said housing-half sections having boss means defining a lateral opening to said housing enclosure and the second of said housing-half sections having an enlargement defining a chamber opening into said housing enclosure aligned with said opening of said first housing-half section; each of said housing-half sections having set screws axially aligned and circumferentially spaced through said end flange at each end of each of said half sections for expanding gasket means within said housing enclosure at each end thereof around said pipe passing these through; a first pair of annular electrical insulators having a tubular portion adapted to fit around said pipe through said first internal flanges of said housing-half sections and said insulators having outwardly extending flanges in a plane perpendicular to the axis through said tubular portions of said insulators for engagement with the internal faces of said first internal flanges of said housing-half sections for positioning each of said insulators with said housing enclosures around said pipe; a second pair of annular electrical insulators each having a first tubular portion adapted to fit around said pipe and extend through one of said end flanges on said housing-half sections for spacing said housing-half sections from said pipe at the ends thereof and said second insulators having annular outwardly extending flanges perpendicular to the axis of said insulator defining a follower ring within each end portion of said housing enclosure when said insulators are assembled on said pipe; each of said electrical insulators being split whereby said insulators may be spread apart and fitted around said pipe during assembly of said device on said pipe; and a one-piece gasket adapted to fit around said pipe within said housing enclosure between said housing-half sections to provide a fluid tight seal between said housing-half sections and said pipe along a longitudinal portion of said pipe, said gasket having split annular end members each adapted to fit within said housing-half sections between one of said second internal flanges and the adjacent end flange of said housing-half sections, each of said end members having a tubular portion extending through said second internal flange between said flange and said pipe and having a conical portion having a conical seal surface engageable with said conical seat surface on said second flange of said housing-half sections to provide an annular seal around said pipe within said housing enclosure at each end of said enclosure, and said gasket having longitudinal side runner portions extending along each side of said gasket between said end members for engagement within said gasket grooves along each of the side portions of each of said housing-half sections to provide a fluid tight longitudinal seal along each side of said housing enclosure between the adjoining side edges of said housing-half sections between said annular end members of said gasket.

2. A split-sleeve type pipe device comprising
    a first housing-half member,
    a second housing-half member securable with said first housing-half member for forming a complete housing enclosure around a portion of a length of a pipe,
    electrical insulating means for encircling said pipe within said housing-half members spacing said half members from said pipe, and
    integral one-piece pressure sealing gasket means around said pipe within said housing-half members for sealing against fluid pressure loss from said housing enclosure along a length of said pipe,
    the gasket means including annular end portions each having an inwardly facing conical seal surface for engagement with a corresponding seal surface in each of said housing-half members and longitudinal runners along opposite sides of the annular end portions connecting said end portions for sealing between said housing-half members along longitudinal lines whereby a longitudinal portion of said pipe is sealed against fluid loss within said housing enclosure between said end portions of said gasket means.

3. A split-sleeve type pipe device as defined in claim 2 wherein
    each of the housing-half members is provided with a first pair of internal longitudinally spaced half-circular flanges to cooperate with the insulating means for holding the latter in position between said pipe and said housing-half members,
    said housing-half members having a second pair of internal longitudinally spaced half-circular flanges to cooperate with said annular end portions of said gasket means to provide a fluid seal along opposite end portions of said pipe device between said pipe and said housing-half members.

4. A split-sleeve type pipe device as defined in claim 3 wherein
    said insulating means includes a first pair of annular members adapted to be disposed in longitudinally spaced relation around said pipe through said first internal flanges in said housing-half members,
    said insulating means has a second pair of annular members adapted to be disposed at opposite extremities of said housing-half members outwardly of said annular end portions of said gasket means,
    the second pair of annular insulating members each having a flange follower ring for engagement with said annular end portions of said gasket means to expand the latter for effecting a fluid tight seal around said pipe within said housing enclosure between said housing-half members and said pipe.

5. A split-sleeve type pipe device as defined in claim 4 including
    means for adjusting said gasket means independently of said electrical insulating means,
    the adjusting means having a plurality of circumferentially spaced axially aligned set screws in opposite ends of each of said housing-half members for engaging each flange follower ring of said second pair of insulating members for urging each of said follower rings inwardly to apply a longitudinal compression force on said annular end portions of said gasket means.

6. A split-sleeve type device as defined in claim 5 wherein
    said first housing-half member is provided with an external cylindrical boss defining a lateral opening into said housing enclosure for connection of auxiliary apparatus to said device,
    said second housing-half member having an external lateral enlargement defining a chamber opening into said housing enclosure opposite the boss of said enclosure and aligned with the lateral opening thereof.

7. A split-sleeve type pipe device comprising
    a first housing-half member,
    a second housing-half member securable with said first housing-half member for forming a complete housing enclosure around a portion of a length of pipe,
    electrical insulating means for encircling the pipe within the housing-half members spacing said members from said pipe,
    integral one-piece pressure sealing gasket means around said pipe within said housing-half members for sealing against fluid pressure loss from the housing enclosure along a length of said pipe,
    the gasket means having longitudinally spaced annular seals between said pipe and said housing-half members and longitudinal side seals along said pipe connected between the spaced annular seals disposed between said housing-half members, and
    means for applying a longitudinal compression force to the extremities of said gasket means for expanding said extremities around said pipe within said housing enclosure to seal between said pipe and said housing-half members.

8. A split-sleeve type pipe device as defined in claim 7 wherein
    each of said housing-half members is provided with a first pair of longitudinally spaced internal half-circular flanges to cooperate with the electrical insulating means for holding the latter in position between said pipe and said housing-half members, said housing-half members have a second pair of internal longitudinal spaced half-circular flanges to cooperate with said extremities of said gasket means to provide a fluid seal along opposite end portions of said pipe device between said pipe and said housing-half members.

9. A split-sleeve type pipe device as defined in claim 8 wherein said electrical insulating means includes a first pair of annular members adapted to be disposed in longitudinally spaced relation around said pipe through said first internal flanges in said housing-half members, said insulating means has a second pair of annular members adapted to be disposed at opposite extremities of said housing-half members outwardly of said extremities of said gasket means and forming a part of the longitudinal compression force applying means, the second pair of annular insulating members each having a flange follower ring for engagement with said extremities of said gasket means to expand the latter for effecting a fluid tight seal around said pipe within said housing enclosure between said housing-half members and said pipe.

10. A split-sleeve type pipe device as defined in claim 9 wherein said longitudinal compression force applying means includes a plurality of circumferentially spaced axially aligned set screws in opposite ends of each of said housing-half members for engaging the flange follower rings of said second pair of insulating members for urging said flange follower rings inwardly to apply a longitudinal compression force on said extremities of said gasket means.

* * * * *

UNITED STATES PATENT OFFICE
CERTIFICATE OF CORRECTION

Patent No. 3,861,422     Dated 1-21-75

Inventor(s) Joe William Christie

It is certified that error appears in the above-identified patent and that said Letters Patent are hereby corrected as shown below:

Column 4, line 58, after each insert --end--

Column 5, line 23, delete "ad" and insert --as--

Column 6, line 2, delete "by" and insert --be--

Signed and sealed this 20th day of May 1975.

(SEAL)
Attest:

RUTH C. MASON
Attesting Officer

C. MARSHALL DANN
Commissioner of Patents
and Trademarks